E. C. SHAW.
VEHICLE WHEEL RIM.
APPLICATION FILED JUNE 14, 1907.
1,060,290.
Patented Apr. 29, 1913.
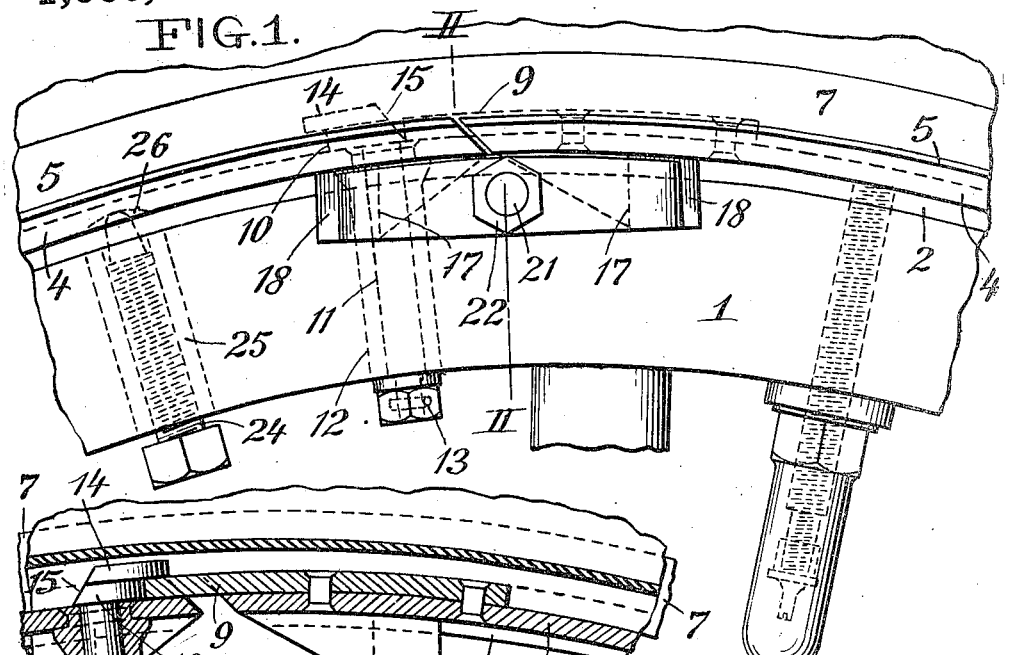
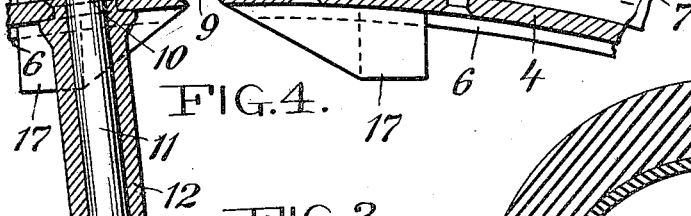
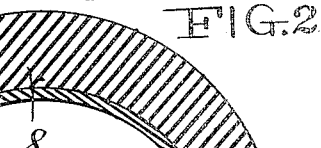
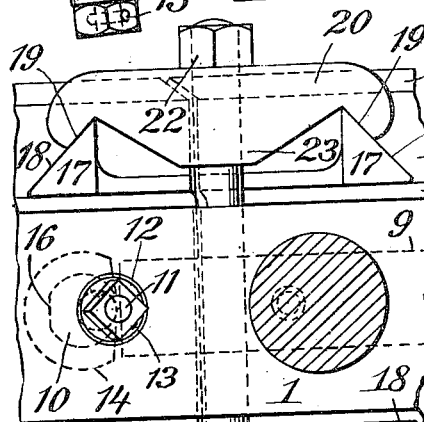
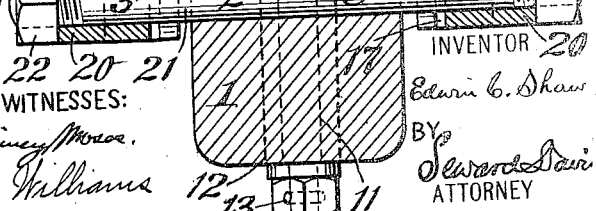
WITNESSES:
INVENTOR
Edwin C. Shaw
BY
ATTORNEY

UNITED STATES PATENT OFFICE.

EDWIN COUPLAND SHAW, OF AKRON, OHIO, ASSIGNOR, BY MESNE ASSIGNMENTS, TO THE UNITED RIM COMPANY, OF AKRON, OHIO, A CORPORATION OF OHIO.

VEHICLE WHEEL-RIM.

1,060,290.  Specification of Letters Patent.  Patented Apr. 29, 1913.

Application filed June 14, 1907. Serial No. 379,028.

*To all whom it may concern:*

Be it known that I, EDWIN COUPLAND SHAW, a citizen of the United States, and a resident of Akron, in the county of Summit and State of Ohio, have invented certain new and useful Improvements in Vehicle Wheel-Rims, of which the following is a specification.

This invention relates to that class of vehicle wheel rims shown and described in my applications Serial Numbers 375,716 and 375,719, filed May 25, 1907, in which the wheel felly is provided with a fixed rim upon which seats a detachable rim carrying the tire. The detachable rim is split so that its diameter can be decreased, and endless tire retaining flanges are provided which slip over the split rim when in its contracted or collapsed condition and seat upon the split rim and engage the tire when the split rim is expanded. When the split rim is fully expanded within the endless tire-retaining flanges it is of sufficient diameter to be slipped freely over the fixed rim upon which it is clamped by being slightly contracted.

One object of my invention is to provide improved means for expanding a split rim, such means consisting of a rotary cam.
Another object of my invention is to provide improved means for contracting a split rim and holding it contracted upon a wheel, such means including one or more cramps or dogs for engaging the ends of the split rim and drawing or holding them together.

Referring to the drawings which form a part of this specification, Figure 1 is the side elevation of a portion of a wheel rim and felly constructed in accordance with my invention. Fig. 2 is a transverse section taken on the line II—II of Fig. 1. Fig. 3 is a bottom plan view of the parts shown in Fig. 1, one of the wheel spokes being shown in section. Fig. 4 is a central, longitudinal, vertical section of the detachable rim and tire shown in Fig. 1.

Referring to the drawings by reference numerals: 1 is the wheel felly to which is fixedly attached in any suitable manner the fixed rim 2 provided with the upstanding flanges 3 at each edge thereof which are turned true to form a seating surface. Upon this seating surface rests the split detachable rim 4 carrying the upstanding flanges 5 and the downwardly projecting flange 6. The flange 6 is adapted to bear against one side of the fixed rim when the detachable rim is in its normal operative position. Endless tire retaining flanges 7 are provided which slip over the flanges 5 when the split rim 4 is contracted or collapsed by having its ends telescoped or overlapped, but which seat on the split rim and against the flanges 5 when the split rim is expanded. These flanges 7 are given any suitable form depending upon the type of tire which they are designed to hold. In this instance they are shown as formed to engage the beads on the clencher tire 8. One end of the split detachable rim is provided with a tongue 9 which normally overlaps the other end of the rim. The means for expanding the detachable rim consists of a cam 10 carried by an end of the detachable rim and engaging the end of the tongue 9. The cam 10 is rigidly fixed to, or formed integrally with a shaft 11 which turns in a sleeve 12 riveted or otherwise suitably fixed to the detachable rim. A bolt-head 13 may be attached to the end of this shaft though any other means for turning the shaft may of course be used. The cam 10 is provided on its upper end with a flange 14 which is adapted to overlap the end of the tongue 9 when the rim is in expanded position and hold the tongue in close engagement with the end of the rim, thus locking the two ends of the rim in fixed relative position. The cam and its flange are provided with an inclined rear face 15 to facilitate the positioning of the tongue 9 when the cam is turned to inoperative position as shown in dotted lines in Fig. 1. The cam is also provided with a flat face 16 which engages the end of the tongue 9 when the cam is turned to operative position and serves to lock it in such position.

For the purpose of drawing the ends of the split detachable rim together and holding the rim contracted upon the wheel, each end of the rim is provided on each side with a lug 17. These lugs project downward from the under surface of each end of the detachable rim and are provided with vertical outwardly inclined surfaces 18 on their rear ends which are formed for wedging engagement with similarly inclined surfaces 19 formed on the dogs or cramps 20. A pair of these dogs or cramps is used, one for each pair of lugs 17, the cramps being centrally apertured to receive a transverse bolt 21 having nuts 22 screwed on each end to draw the cramps toward each other, thus in turn wedging the lugs 17 together and drawing up on the split detachable rim. The cramps 20 are made of greater depth near their apertures as shown at 23 for the purpose of giving them strength to resist bending.

The operation of the device is as follows: Supposing the detachable rim to be free from the fixed rim, the cam is turned to inoperative position and the end of the split rim which carries the cam is drawn down and slipped under and by the other end of the split rim thus reducing its diameter, when one of the retaining flanges 7 can be removed and the tire put in place. The retaining flange is then put back and the rim expanded. This can readily be done by hand sufficiently to permit the tongue 9 to engage the inclined face of the cam as shown in dotted lines in Fig. 1. By then applying a wrench to nut 13 and turning the cam into the position shown in Fig. 4, the ends of the split rim are forced apart causing the rim to engage the inner surfaces of the flanges 7, and by means of the flange 14 on the cam and the flat face 16, the parts are locked in this position. The tire can then be inflated, and with the detachable rim forms a unitary structure which can be transported and applied to the wheel whenever necessary. When it is desired to fix the detachable rim to the fixed rim the valve stem is first slipped through its proper opening in the fixed rim and felly and the detachable rim slipped over the fixed rim till its flange 6 engages the side of the fixed rim. The cam 10 is then turned to inoperative position, thus permitting the split rim to be contracted upon the fixed rim by the pressure of the air in the inflated tire. This pressure acts directly inward upon the split rim and also forces the endless flanges 7 laterally, causing them to wedge against the outwardly inclined or flared inner faces of the flanges 5, and thus exerting a further contractive effort upon the split rim. The cramps 20 are then applied to the lugs 17 and the nuts 22 turned up, the cramps acting to complete the contraction of the split rim upon the fixed rim in case the pressure of the tire has not fully effected this operation. The cramps serve to lock the rim positively in contracted position upon the fixed rim. This is usually sufficient to hold the detachable rim in place, but I sometimes desire to use as additional means for this purpose the set screws 24 which pass through threaded sleeves 25 carried by the fixed rim. These set screws engage shallow depressions 26 on the inner surface of the detachable rim.

In order to permit the expansion and contraction of the rim when mounted upon the wheel, the opening in the wheel felly through which the valve-stem passes is elongated, as indicated in dotted lines in Fig. 1.

While I have shown in the drawings and described in the specification a preferred embodiment of my invention, it will be understood that various modifications may be made therein, and I do not intend to limit my invention to specific details of construction or to combinations of the several elements of my invention any further than as specified in the appended claims. It will be understood that my improved expanding means and contracting means may be applied to a transversely split rim whether or not such rim is provided with endless tire-retaining flanges, and also that such means may be used independently of one another.

Having thus described my invention I claim:

1. In combination in a vehicle wheel, a fixed rim, a split detachable rim, endless tire retaining flanges carried by said detachable rim, means for expanding said detachable rim, and means for wedging the ends of said detachable rim together.

2. In a vehicle wheel, in combination, a fixed rim, a split detachable rim, and means for expanding said split rim and locking it in expanded position, comprising a rotary cam carried by one end of said split rim engaging an abutment on the other end thereof, said cam having a flattened portion near its point of greatest eccentricity, whereby when the cam is turned so that the flattened portion engages the abutment the cam will be held in such position.

3. In a vehicle wheel, a fixed rim, a split detachable rim, and means for holding the ends of the split detachable rim together, comprising a cramp formed of a body part, with ends turned at an angle thereto to form hooks, said hooks engaging portions of the split rim on opposite sides of the split.

4. In combination in a vehicle wheel, a fixed rim, a split detachable rim, endless tire retaining flanges carried by said detachable rim, a rotary cam for expanding said detachable rim, lugs on the ends of said detachable rim, and cramps for drawing said lugs together.

5. In combination in a vehicle wheel, a fixed rim, a split detachable rim, endless tire retaining flanges carried by said detachable rim, a tongue on one end of said detachable rim, a rotary cam carried by the other end of said detachable rim and engaging said tongue, and means for rotating said cam.

6. In combination in a vehicle wheel, a fixed rim, a split detachable rim, endless tire retaining flanges carried by said detachable rim, a tongue carried by one end of said detachable rim, a rotary cam carried by the other end of said detachable rim, means for turning said cam, said cam being provided with an inclined rear face and with a flange adapted to overlie the end of said tongue, lugs carried by each end of said detachable rim and provided with outwardly inclined vertical faces, a pair of cramps adapted to engage said lugs, and a bolt for drawing said cramps together.

7. In combination with a vehicle wheel, a split detachable rim, a rotary cam co-acting with portions of said rim upon opposite sides of the split therein for expanding said rim, said cam being exterior to the tire-seating surface of said rim, and separate means for contracting said rim, said means locking said rim against accidental expansion while the same is mounted in operative position upon the vehicle wheel.

8. A detachable tire-carrying rim for vehicle wheels comprising a transversely split ring and means for contracting the same, comprising a cramp having a body part and laterally projecting arms, the inner or adjacent faces of which flare outwardly, said arms engaging portions of the split ring on opposite sides of the split therein, and means for securing the cramp in operative position.

9. A detachable tire-carrying rim for vehicle wheels, comprising a transversely split ring and means for connecting the ends thereof comprising a cramp having a body part and laterally projecting arms, the inner or adjacent faces of said arms being flared outwardly and engaging portions of the split ring on opposite sides of the split therein, and a screw-threaded member engaging the body of the cramp between the arms thereof for moving the cramp laterally of the rim.

EDWIN COUPLAND SHAW.

Witnesses:
E. QUINCY MOSES,
OLIVER WILLIAMS.